(12) United States Patent
Butterworth (10) Patent No.: US 9,442,636 B2
(45) Date of Patent: Sep. 13, 2016

(54) QUICK SPLIT MODE

(71) Applicant: NAVICO HOLDING AS, Egersund (NO)

(72) Inventor: Paul Butterworth, Auckland (NZ)

(73) Assignee: NAVICO HOLDING AS, Egersund (NO)

( * ) Notice: Subject to any disclaimer, the term of this patent is extended or adjusted under 35 U.S.C. 154(b) by 401 days.

(21) Appl. No.: 13/791,731

(22) Filed: Mar. 8, 2013

(65) Prior Publication Data

US 2014/0013259 A1   Jan. 9, 2014

Related U.S. Application Data

(60) Provisional application No. 61/668,963, filed on Jul. 6, 2012.

(51) Int. Cl.
G06F 3/048 (2013.01)
G06F 3/0484 (2013.01)
G06F 3/0488 (2013.01)
G06F 3/0482 (2013.01)

(52) U.S. Cl.
CPC ........... *G06F 3/0484* (2013.01); *G06F 3/0482* (2013.01); *G06F 3/0488* (2013.01); *G06F 3/04842* (2013.01)

(58) Field of Classification Search
None
See application file for complete search history.

(56) References Cited

U.S. PATENT DOCUMENTS

| 4,829,493 A | 5/1989 | Bailey |
|---|---|---|
| 4,879,697 A | 11/1989 | Lowrance et al. |
| 5,025,423 A | 6/1991 | Earp |
| 5,191,341 A | 3/1993 | Gouard et al. |
| 5,537,380 A | 7/1996 | Sprankle et al. |
| 6,225,984 B1 | 5/2001 | Crawford |
| 6,321,158 B1 | 11/2001 | DeLorme et al. |
| 6,411,283 B1 | 6/2002 | Murphy |
| 6,418,080 B2 | 7/2002 | Inouchi |
| 6,421,299 B1 | 7/2002 | Betts et al. |
| 6,761,692 B2 | 7/2004 | Angelsen et al. |
| 6,816,782 B1 | 11/2004 | Walters et al. |

(Continued)

OTHER PUBLICATIONS

PCT International Search Report and Written Opinion; PCT/IB2013/060285; Feb. 18, 2014.

(Continued)

*Primary Examiner* — William Trapanese
(74) *Attorney, Agent, or Firm* — Nelson Mullins Riley & Scarborough LLP (57) ABSTRACT

Described herein are implementations of various technologies for a method and apparatus for displaying marine electronic data. In one implementation, a non-transitory computer-readable medium having stored thereon computer-executable instructions which, when executed by a computer, causes the computer to perform various actions. In one implementation, the actions may include displaying a plurality of possible marine electronic data types to be displayed. A selection to display one of the plurality of possible marine electronic data types in the plurality of possible marine electronic data types may be received. A plurality of possible combinations of marine electronic data types to be displayed with the one of the plurality of possible marine electronic data types may be displayed. A selection from the plurality of possible combinations may then be received. A combination of marine electronic data that correspond to the selection from the plurality of possible combinations may be displayed.

23 Claims, 8 Drawing Sheets

(56) References Cited

U.S. PATENT DOCUMENTS

| | | | |
|---|---|---|---|
| 7,002,579 B2 | 2/2006 | Olson | |
| 7,236,426 B2 | 6/2007 | Turner et al. | |
| 7,430,461 B1 | 9/2008 | Michaels | |
| 7,652,952 B2 | 1/2010 | Betts et al. | |
| 7,710,825 B2 | 5/2010 | Betts et al. | |
| 7,729,203 B2 | 6/2010 | Betts et al. | |
| 7,755,974 B2 | 7/2010 | Betts et al. | |
| 7,812,667 B2 | 10/2010 | Fagg | |
| 7,870,496 B1 | 1/2011 | Sherwani | |
| 7,890,867 B1 | 2/2011 | Margulis | |
| 8,019,532 B2 | 9/2011 | Sheha et al. | |
| 8,063,540 B2 | 11/2011 | Angelsen et al. | |
| 2002/0035574 A1 | 3/2002 | Dumas | |
| 2002/0093541 A1 | 7/2002 | Schileru-Key | |
| 2004/0193364 A1 | 9/2004 | Chojnacki | |
| 2005/0102101 A1 | 5/2005 | Beesley et al. | |
| 2006/0013066 A1 | 1/2006 | Nishimori et al. | |
| 2006/0119585 A1 | 6/2006 | Skinner | |
| 2006/0136478 A1* | 6/2006 | Berkner | 707/102 |
| 2006/0224940 A1 | 10/2006 | Lee | |
| 2008/0104051 A1* | 5/2008 | Gosper | 707/5 |
| 2008/0126935 A1 | 5/2008 | Blomgren | |
| 2008/0204424 A1 | 8/2008 | Jin et al. | |
| 2009/0064055 A1 | 3/2009 | Chaudhri et al. | |
| 2009/0099871 A1 | 4/2009 | Gadodia | |
| 2009/0179789 A1 | 7/2009 | Haughay, Jr. et al. | |
| 2009/0249247 A1 | 10/2009 | Tseng et al. | |
| 2009/0287409 A1 | 11/2009 | Summers | |
| 2010/0080082 A1 | 4/2010 | Betts et al. | |
| 2010/0145601 A1 | 6/2010 | Kurtti et al. | |
| 2010/0199225 A1 | 8/2010 | Coleman et al. | |
| 2010/0226203 A1 | 9/2010 | Buttle et al. | |
| 2010/0250122 A1 | 9/2010 | Kubota et al. | |
| 2011/0013484 A1 | 1/2011 | Coleman et al. | |
| 2011/0013485 A1 | 1/2011 | Maguire | |
| 2011/0019887 A1 | 1/2011 | Roehrig et al. | |
| 2011/0025720 A1 | 2/2011 | Jo et al. | |
| 2011/0154183 A1 | 6/2011 | Burns et al. | |
| 2012/0001773 A1 | 1/2012 | Lyons et al. | |
| 2012/0011437 A1 | 1/2012 | James et al. | |
| 2012/0014220 A1 | 1/2012 | DePasqua | |
| 2012/0069712 A1 | 3/2012 | Potanin et al. | |
| 2012/0106300 A1 | 5/2012 | Maguire | |
| 2012/0185801 A1 | 7/2012 | Madonna et al. | |
| 2013/0007665 A1 | 1/2013 | Chaudhri et al. | |
| 2013/0271301 A1* | 10/2013 | Kabel et al. | 340/987 |

OTHER PUBLICATIONS

PCT International Search Report and Written Opinion; PCT/US2013/047869; Oct. 21, 2013.
PCT International Search Report and Written Opinion; PCT/US2013/048177; Oct. 21, 2013.
PCT International Search Report and Written Opinion; PCT/US2013/048129; Oct. 17, 2013.
PCT International Search Report and Written Opinion; PCT/US2013/047926; Oct. 11, 2013.
PCT International Search Report and Written Opinion; PCT/US2013/047645; Sep. 27, 2013.

* cited by examiner

FIG. 8

QUICK SPLIT MODE

CROSS-REFERENCE TO RELATED APPLICATIONS

This application claims the benefit of U.S. Provisional Patent Application Ser. No. 61/668,963, filed Jul. 6, 2012, titled QUICK SPLIT MODE, and the disclosure of which is incorporated herein by reference.

BACKGROUND

Discussion of the Related Art

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Accurate data, including, for example, navigation, mapping, and the location of stationary and moving objects, can be very useful for marine activities. The operator of a marine vessel monitors marine traffic. A device that is easy to operate and that provides data in an easy to follow format can provide advantages to the vessel operator. Such advantages may include requiring less time to request and review information, which in turn provides the vessel operator with more time to monitor the marine traffic.

SUMMARY

Described herein are implementations of various technologies for an apparatus and method for displaying marine electronic data. In one implementation, a non-transitory computer-readable medium having stored thereon computer-executable instructions which, when executed by a computer, cause the computer to perform various actions. In one implementation, the actions may include displaying a plurality of possible marine electronic data types to be displayed. A selection to display one of the plurality of possible marine electronic data types in the plurality of possible marine electronic data types may be received. A plurality of possible combinations of marine electronic data types to be displayed with the one of the plurality of possible marine electronic data types may be displayed. A selection from the plurality of possible combinations may then be received. A combination of marine electronic data that correspond to the selection from the plurality of possible combinations may be displayed.

Described herein are also implementations of various technologies for an apparatus for displaying marine electronic navigation data. The apparatus includes one or more processors, a screen and memory. The memory has a plurality of executable instructions. When the executable instructions are executed by the one or more processors, the one or more processors may display a plurality of possible marine electronic data types to be displayed. A selection to display one of the plurality of possible marine electronic data types in the plurality of possible marine electronic data types may be received. A plurality of possible combinations of marine electronic data types to be displayed with the one of the plurality of possible marine electronic data types may be displayed. A selection from the plurality of possible combinations may be received. A combination of marine electronic data that correspond to the selection from the plurality of possible combinations may be displayed.

Described herein are also implementations of various technologies for a method for displaying marine electronic data. In one implementation, the method may display a plurality of possible marine electronic data types to be displayed. A selection to display one of the plurality of possible marine electronic data types along with one or more remaining marine electronic data types in the plurality of possible marine electronic data types may then be received. A plurality of possible combinations of marine electronic data types to be displayed with the one of the plurality of possible marine electronic data types may be displayed. A selection from the plurality of possible combinations may then be received. A computer screen may display a combination of marine electronic data that correspond to the selection from the plurality of possible combinations on a computer screen.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. Nothing in this application is considered critical or essential to the claimed invention unless explicitly indicated as being "critical" or "essential."

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the implementations.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

"Alternatively" shall not be construed to only pertain to situations where the number of choices involved is exactly two, but rather refers to another possibility among many other possibilities.

Additionally, various technologies and techniques described herein include receiving user requests for a number of different operations. In certain instances, the user request for a particular operation will be explicitly described. It shall be understood that "user request" or "user can request" shall also include, but are not limited to, touching the screen, double tapping the screen (tapping the screen twice in rapid succession), pressing a particular physical or virtual button, making a selection from a menu, placement of a cursor at a particular location, stylus pointing, mouse selection, an audible command, as well as the explicit description of the "user request" for the particular operation or how the "user can request", explicitly, the particular operations.

In one implementation, the user can quickly cause a multiple display to appear on a display device. A multiple display can be a split screen view wherein each half of the screen displays a different type of marine electronic data. A multiple display can also include a split screen view, wherein the screen is split into more than two portions.

The user can quickly cause the multiple display to appear by selecting a first marine electronic data type and requesting multiple display. The display device can then display combinations of marine electronic data types, where the first marine electronic data type in the combination is the first marine electronic data type selected by the user, and the second marine electronic data type is a possible second selection. When the user selects one of the combinations, the multiple display with the split screen appears. Each of the selected marine electronic data types appear in one of the halves of the split screen.

In certain implementations, the user can select a combination and request multiple display, again. The display device can display combinations of marine electronic data types that include each previously selected marine electronic data type and another possible selection. This process can be repeated until the user selects a combination without selecting further multiple display.

Figure 1:
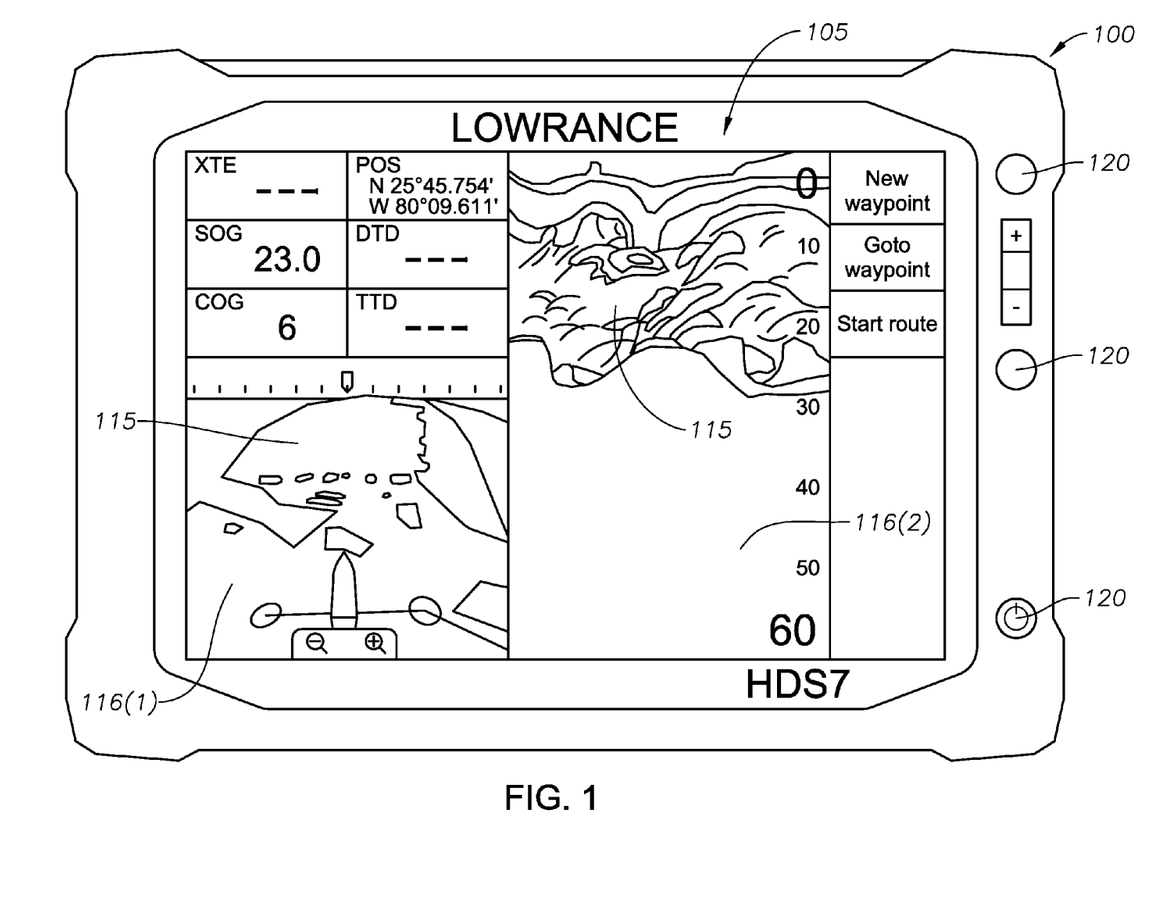
FIG. 1 is a schematic diagram of a multiple display on a display device in accordance with various implementations described herein.

FIG. 1 illustrates a schematic diagram of a multiple display on a display device 100 in accordance with various implementations described herein. The display device 100 includes a screen 105. In certain implementations, the screen 105 can be sensitive to touching by a finger. In other implementations, the screen 105 can be sensitive to the body heat from the finger, a stylus, or responsive to a mouse. The display device 100 can display marine electronic data 115. The marine electronic data types 115 may include chart data, radar data, sonar data, steering data, dashboard data, navigation data and the like. The display device 100 may split the screen 105 into multiple panes 116(1), 116(2). Each pane 116(1), 116(2) may display one of the marine electronic data types. Although only two panes 116(1), 116(2) are shown, in certain implementations, the display device 100 can split the screen 105 into more than two panes 116. The display device 100 may also include a plurality of buttons 120. The plurality of buttons 120 can include either physical buttons or virtual buttons, or a combination thereof.

Figure 2:
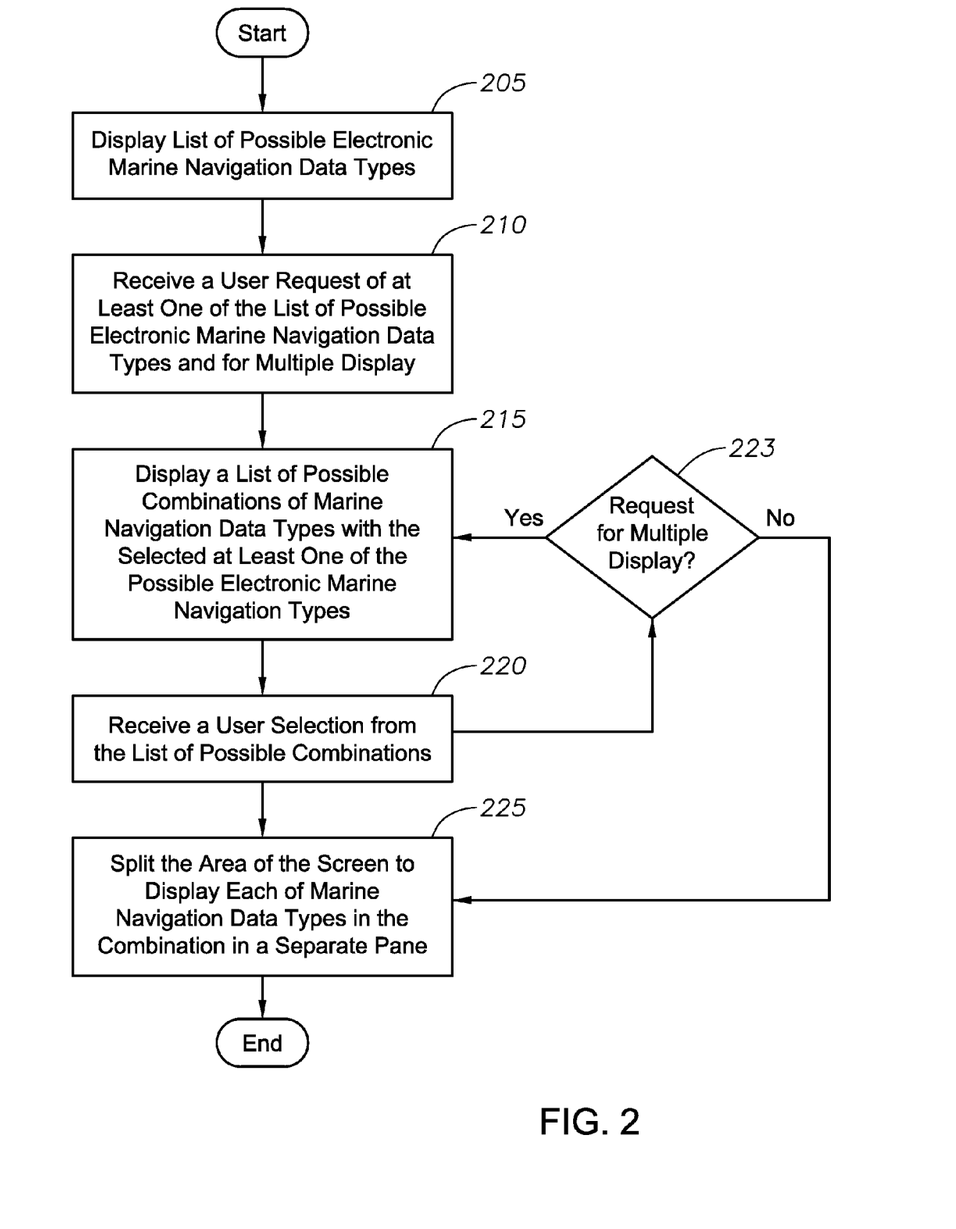
FIG. 2 is a flow diagram describing the operation of the display device in accordance with various implementations described herein.
Figure 3:
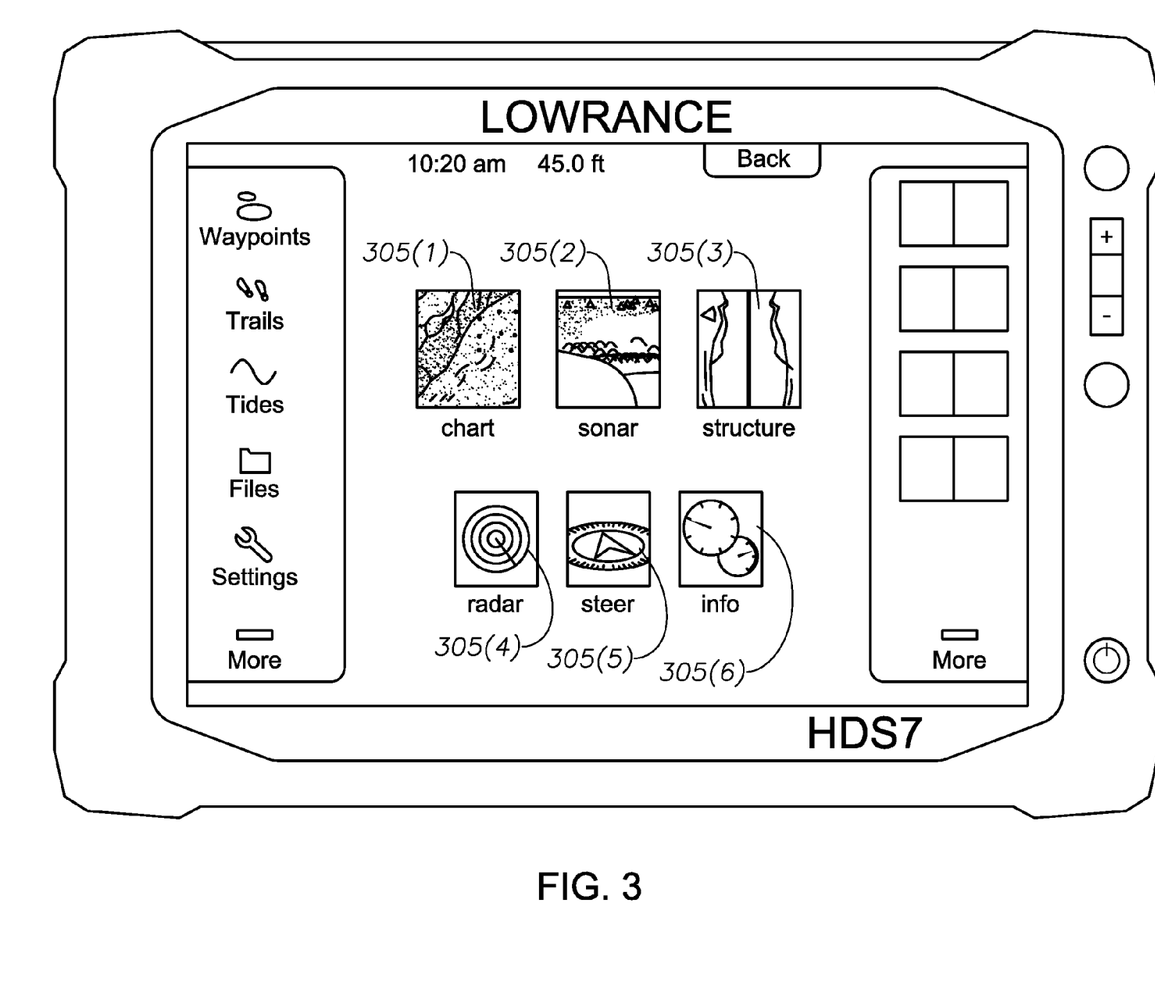
FIG. 3 is a schematic diagram of the display device displaying a list of icons that represent marine electronic navigation data types in accordance with various implementations described herein.

FIG. 2 is a flow diagram describing the operation of the display device 100. FIG. 2 will be described with reference to FIGS. 1, and 3-6. At block 205, the display device 100 may display a list of possible marine electronic data types on the screen 105. In certain implementations, the possible marine electronic data types may be represented by icons. FIG. 3 is a schematic diagram of the display device 100 displaying a list of icons 305 that represent the marine electronic data types. The list of icons may include an icon for chart data type 305(1), sonar data type 305(2), structure data type 305(3), radar data type 305(4), steering data type 305(5), and dashboard information type 305(6).

The chart data type icon 305(1) may be configured for displaying a local map of a region surrounding the location of the display device 100. Where the display device 100 is carried over a body of water by a vessel, the sonar data type icon 305(2) may be configured for displaying sonar data from the body of water surrounding the vessel. The structure data type icon 305(3) may be configured for providing a higher resolution image covering a wider area of the body of water surrounding the vessel. The radar data type icon 305(4) may be configured for providing a radar view of the area surrounding the display device 100. The steering data type icon 305(5) may be configured for displaying information such as distance to destination, speed over ground, and time to destination. The dashboard data type icon 305(6) may be configured for displaying an instrument panel for a vessel carrying the display device. The instrument panel may include measurement meters that provide information such as, for example, bearing, speed, fuel level, and oil level.

Turning back to FIG. 2, at block 210, the display device 100 receives a user request for one of the possible marine electronic data types and a user request for a multiple display with another one of the possible marine electronic data types. In certain implementations, the user request of the possible marine electronic data types and the request for multiple display can either comprise a single continuous action or two or more separate and discrete actions.

Figure 4:
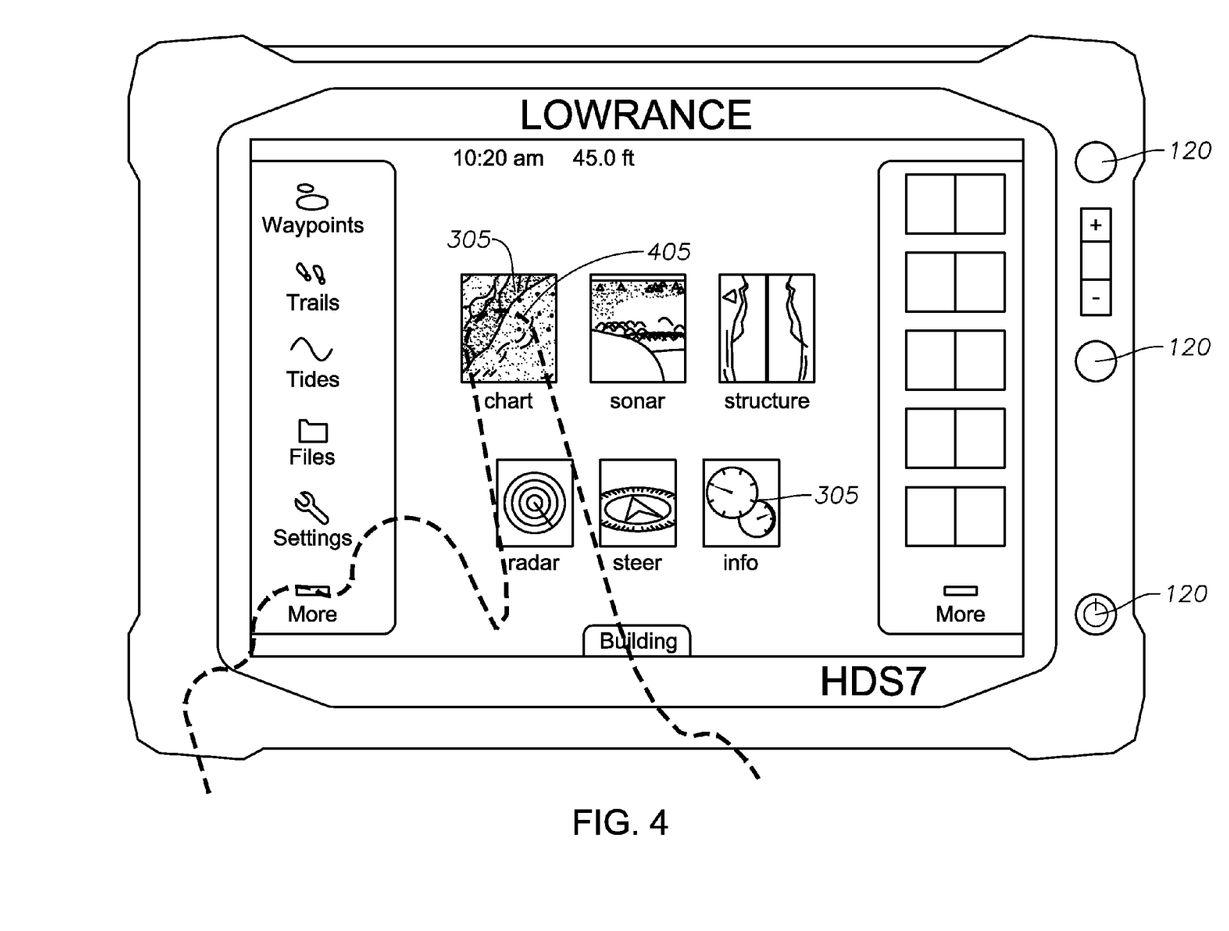
FIG. 4 is a schematic diagram that illustrates receiving a user request of a possible marine electronic navigation data types and a user request for the multiple display in accordance with various implementations described herein.

FIG. 4 is a schematic diagram that illustrates the display device 100 receiving a user request of a possible marine electronic data type and a user request for the multiple display. The user request for at least one of the possible marine electronic data types may include placement of a finger 405 over an icon 305 representing the desired electronic marine type, e.g., the chart data type 305(1). The user request for multiple display can be placement of the finger 405 over the icon 305 representing the desired marine electronic data type for at least a predetermined period of time. Alternatively, the user request for multiple display can include another separate and discrete action such as pressing one of the buttons 120.

Upon receipt of the user request to display a particular marine electronic data type and the request for multiple display, the display device 100 at block 215 displays a list of possible combinations of marine electronic data types that include the marine electronic data type that was selected in block 210, e.g., the chart data type 305(1).

In certain implementations, each possible combination includes the marine electronic data type selected at block 210, e.g., the chart data type 305(1), combined with each of the remaining marine electronic data types that were in the list of block 205, but not selected during 210. In other implementations, the display device 100 can also display a combination that includes the selection form block 210 combined again with the same selection. Each combination may be represented by an icon.

Figure 5:
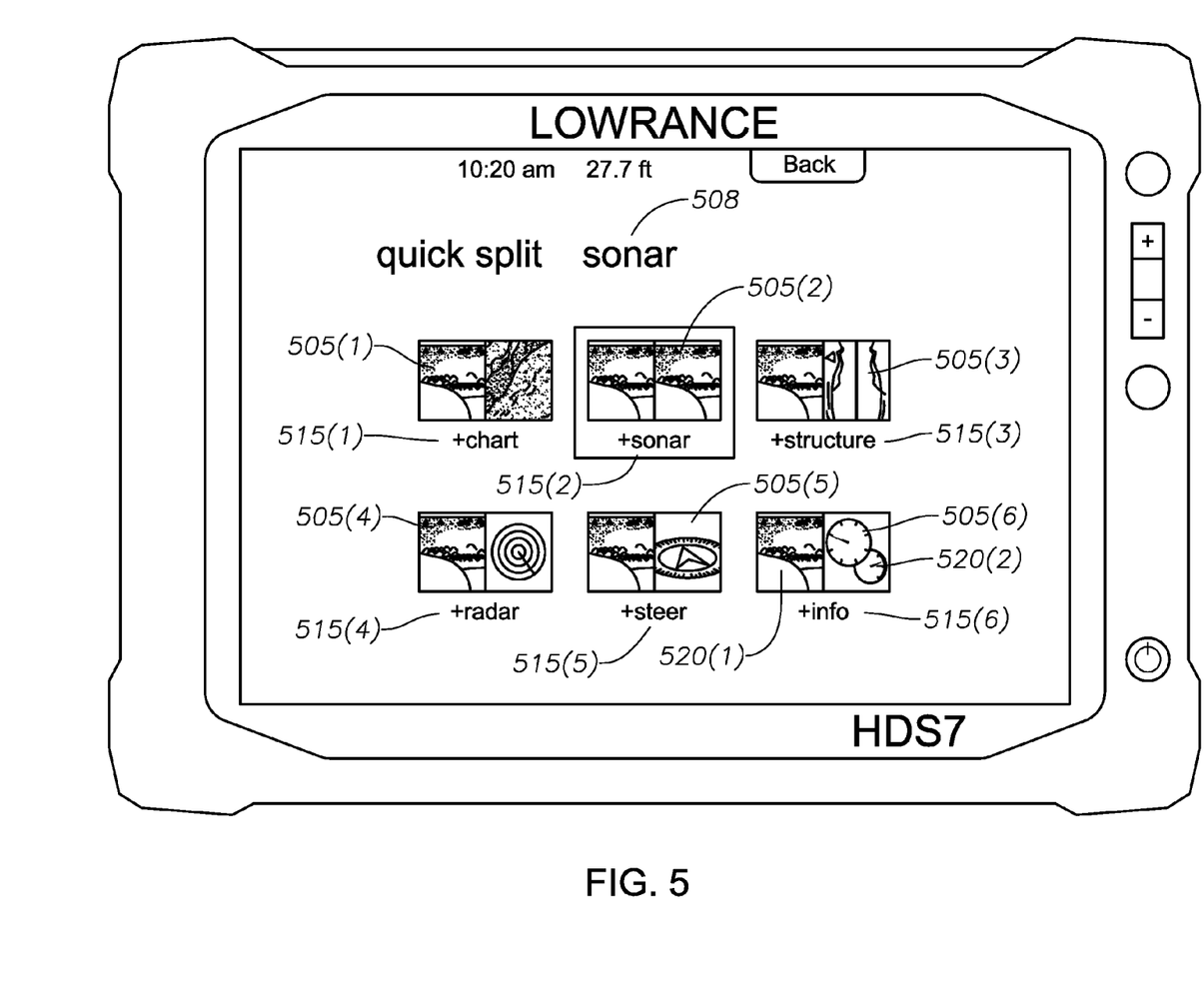
FIG. 5 illustrates a schematic of the display device displaying icons representing possible combinations of marine electronic navigation data type in accordance with various implementations described herein.

FIG. 5 illustrates a schematic of the display device 100 displaying icons 505(1) . . . 505(6) representing possible combinations ("combination icons") of marine electronic data type in accordance with block 215 mentioned above. In certain implementations, the display device 100 can display an indicator 508 of the selection made at block 210 (e.g., sonar). The display device 100 may also display each possible combination icon 505(1) . . . 505(6) representing the selection made during block 210 and an additional possible choice of marine electronic data type, e.g., chart data 515(1), sonar data 515(2), structure data 515(3), radar data 515(4), steering data 515(5), and dashboard data 515(6).

In certain implementations, the combination icons 505 may indicate how the screen would appear if the combination icon 505 were selected. For example, consider combination icon 505(6). Combination icon 505(6) represents the combination of sonar data and dashboard data. If the user selects combination icon 505(6), the display device 100 would display sonar data on the left pane 116(1) of the screen and dashboard data on the right pane 116(2) of the screen. Similarly, the combination icon 505(6) has a left half 520(1) that shows sonar data, and a right half 520(2) that shows dashboard data.

Additionally, in certain implementations, the icons 505 can appear in an order, wherein the choices for the marine electronic data type in the second pane 520(2) may appear in the same order as the marine electronic data type presented in block 205. For example, in FIG. 5, icons 505 for the second marine electronic navigation data type can appear in order, +chart 505(1), +sonar 505(2), +structure 505(3), +radar 505(4), +steer 505(5), and +info 505(6).

As noted above, although only two panes 116(1), 116(2) are shown, in certain implementations, the display device 100 can split the screen 105 into more than two panes. The combination icons 505 can indicate how the screen would appear if the combination icon 505 were selected. For example, if the user had made four prior choices, the combination icons 505 could be divided into five sections. The first four sections would show each of the first four choices. The remaining section of the combination icon 505 could show the marine electronic data type underneath the combination icon 505.

Returning to FIG. 2, at block 220, the display device 100 receives a user selection from the list of possible combinations. In certain implementations, the user can select a particular combination by touching the combination.

As mentioned above, the display device 100 can display more than two different marine electronic data types. At block 223, a determination is made as to whether a user selection for an additional data type is selected. If an additional selection of an additional data type is selected, block 220 repeats.

Figure 6:
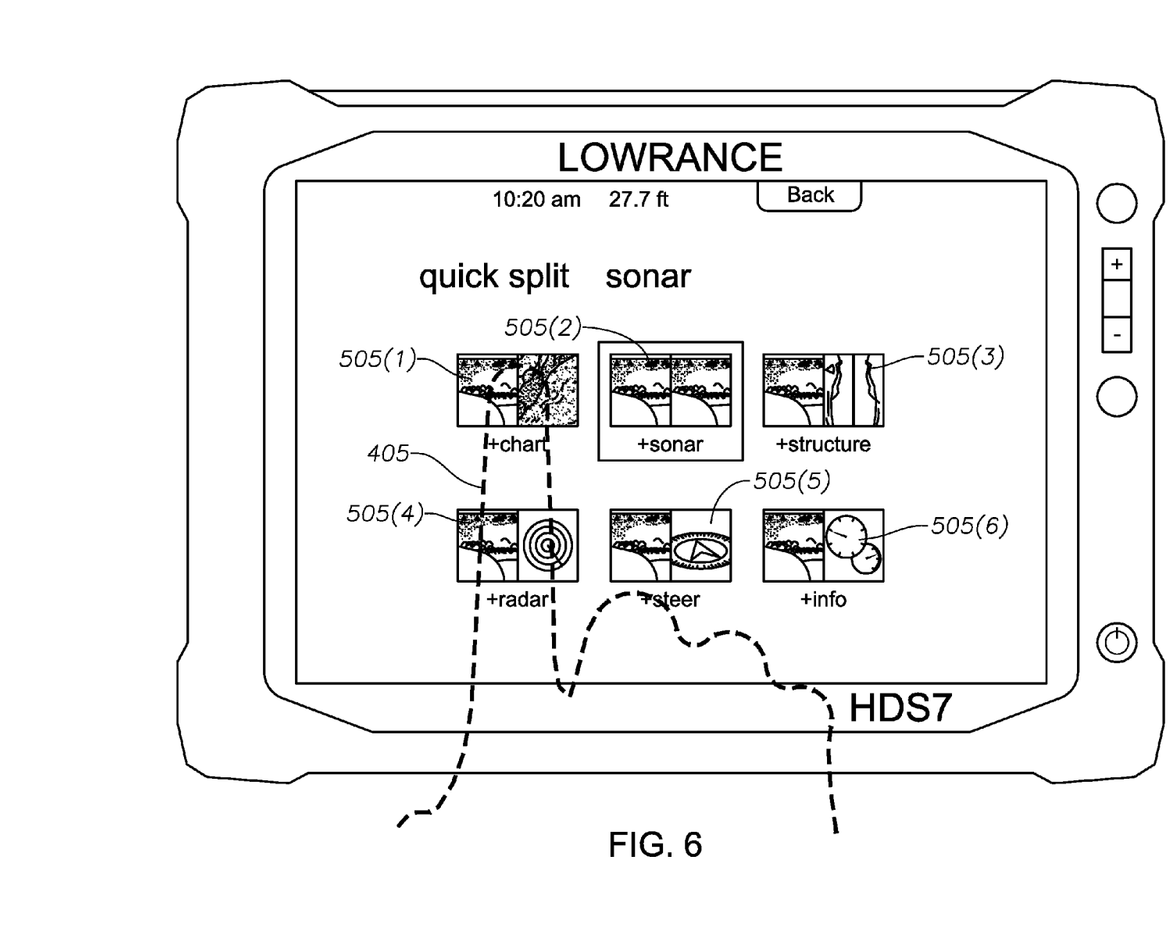
FIG. 6 illustrates the user selection of a particular combination in accordance with various embodiments described herein.

FIG. 6 illustrates user selection of a particular combination 505, e.g., sonar+chart. The user selection may include touching the desired combination 505, e.g., sonar+chart, with their finger 410. As stated above, the display device 100 is not limited to combinations of only two electronic marine data types. When the display device 100 displays combinations icons 505 for selection, the user request can also request further multiple display (dividing the display screen to have an additional pane to show an additional type of marine electronic data).

The user request for further multiple display may be implemented by placement of the finger 405 over the combination icon 505 representing the combination for at least a predetermined period of time. Alternatively, the user request for multiple display can include another separate and discrete action such touching the combination icon 505 and pressing one of the buttons 120.

Figure 7:
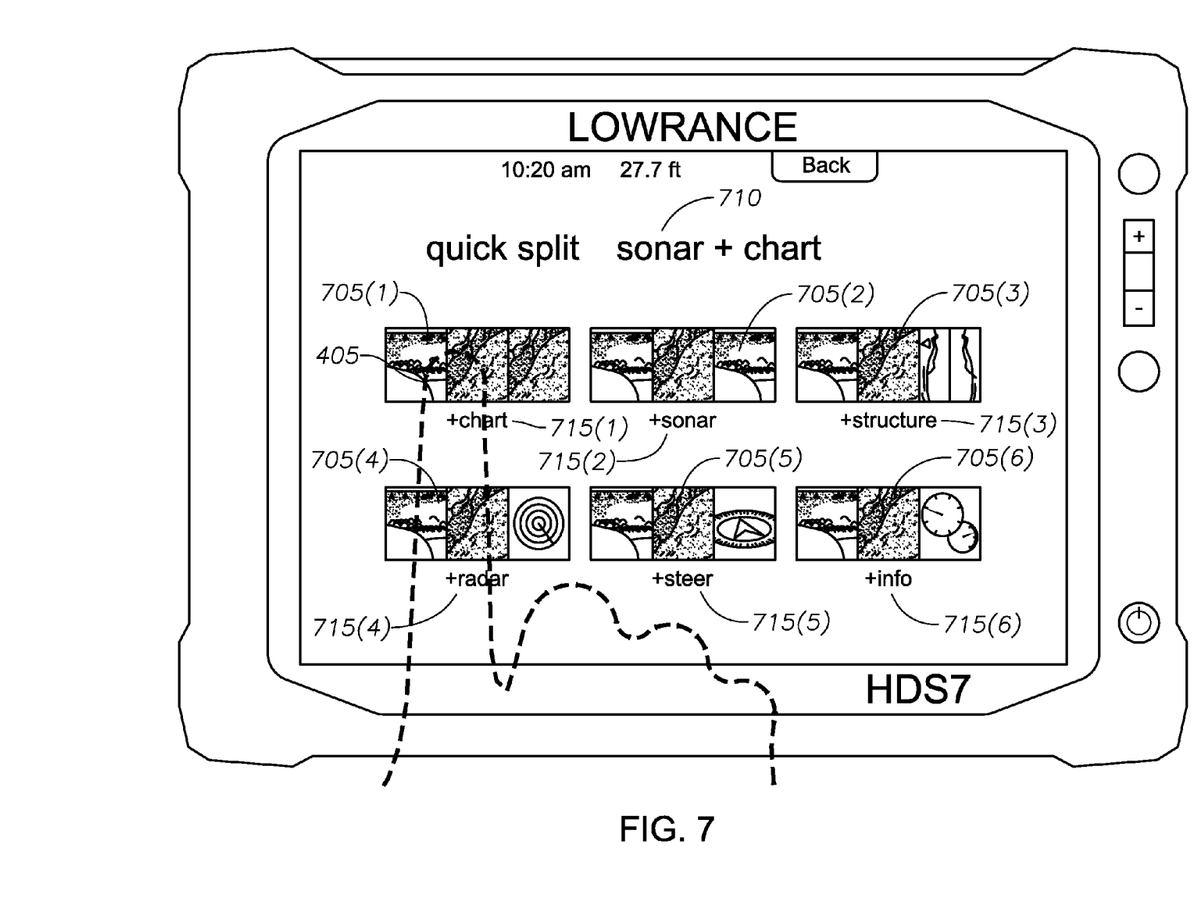
FIG. 7 illustrates a schematic of the display device where the user has requested an additional multiple display in accordance with various described herein.

FIG. 7 illustrates schematic of the display device 100 where the user has requested an additional multiple display. The display device 100 displays additional possible combination icons 705(1) . . . 705(6) of electronic marine navigation data types. The combinations may be represented by icons. Each possible combination comprises the selections at previously made in block 210. In certain implementations, the display device 100 can include an indicator of each of the selections 710 made at block 210. Additionally, the next, e.g., $3^{rd}$, $4^{th}$ as the case may be, marine electronic navigation data type in the combination icons 715(1) . . . 715(6) may appear in the same order that the electronic marine navigation data type appeared during block 210.

For example, in the present schematic, the user has previously selected sonar data type, requested multiple display, selected chart data, and again requested multiple display. Selection of an icon 715, e.g., icon 715(6), can cause the display device 100 to split the screen 105 into three vertically aligned panes, wherein the leftmost pane can display sonar data, the middle pane displays chart data, and the rightmost pane to display dashboard data.

Returning to FIG. 2, if no additional selection of an additional data type is selected at block 222, at block 225 the display device 100 splits the screen 105 into separate panes for each selected electronic marine data type.

Computing System

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hard-wired links, wireless links, or combinations thereof. In a distributed computing environment, program modules may be located in both local and remote computer storage media including memory storage devices.

Figure 8:
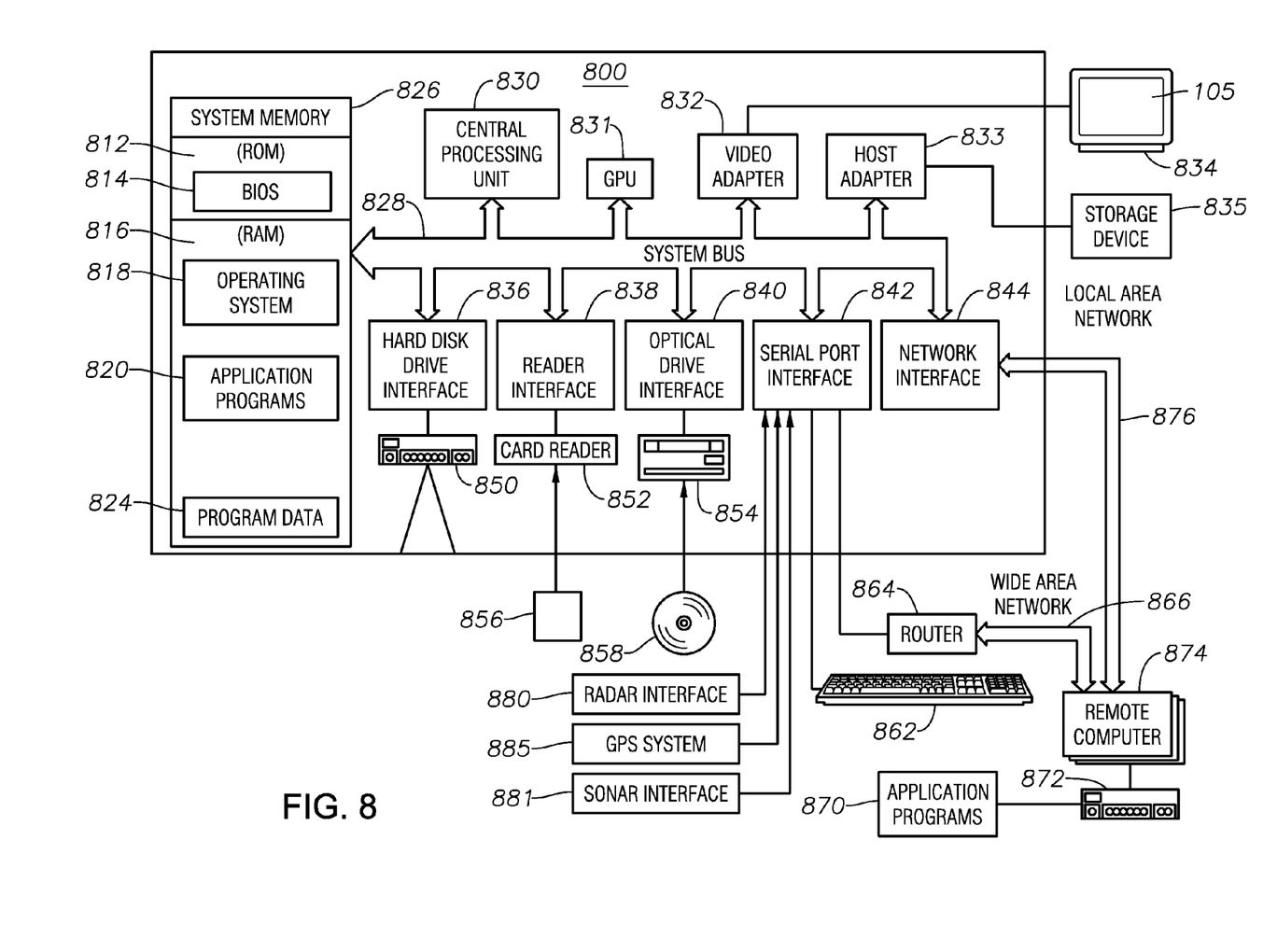
FIG. 8 illustrates a schematic diagram of a computing system in which the various technologies described herein may be incorporated and practiced.

FIG. 8 illustrates a schematic diagram of a multi-function display 899 comprising a computing system 800 in which the various technologies described herein may be incorporated and practiced. The computing system 800 may be a conventional desktop, a handheld device, personal digital assistant, a server computer, electronic device/instrument, laptop, tablet, or part of a navigation system, marine electronics, or sonar system. It should be noted, however, that other computer system configurations may be used.

The computing system 800 may include a central processing unit (CPU) 830, a system memory 826, a graphics processing unit (GPU) 831 and a system bus 828 that couples various system components including the system memory 826 to the CPU 830. Although only one CPU 830 is illustrated in FIG. 8, it should be understood that in some implementations the computing system 800 may include more than one CPU 830.

The CPU 830 can include a microprocessor, a microcontroller, a processor, a programmable integrated circuit, or a combination thereof. The CPU 830 can comprise an off-the-shelf processor such as a Reduced Instruction Set Computer (RISC™), or a Microprocessor without Interlocked Pipeline Stages (MIPS™) processor, or a combination thereof. The CPU 830 may also include a proprietary processor.

The GPU 831 may be a microprocessor specifically designed to manipulate and implement computer graphics. The CPU 830 may offload work to the GPU 831. The GPU 831 may have its own graphics memory, and/or may have access to a portion of the system memory 826. As with the CPU 830, the GPU 831 may include one or more processing units, and each processing unit may include one or more cores.

The CPU 830 may provide output data to a GPU 831. The GPU 831 may generate graphical user interfaces that present the output data. The GPU 831 may also provide objects, such as menus, in the graphical user interface. A user may provide inputs by interacting with the objects. The GPU 831 may receive the inputs from interaction with the objects and provide the inputs to the CPU 830. A video adapter 832 may be provided to convert graphical data into signals for a monitor 834. The monitor 834 includes a screen 805. The screen 805 can be sensitive to heat or touching (now collectively referred to as a "touch screen").

The system bus 828 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 826 may include a read only memory (ROM) 812 and a random access memory (RAM) 816. A basic input/output system (BIOS) 814, containing the basic routines that help transfer information between elements within the computing system 800, such as during start-up, may be stored in the ROM 812.

The computing system 800 may further include a hard disk drive interface 836 for reading from and writing to a hard disk 850, a memory card reader 852 for reading from and writing to a removable memory card 856, and an optical disk drive 854 for reading from and writing to a removable optical disk 858, such as a CD ROM or other optical media. The hard disk 850, the memory card reader 852, and the optical disk drive 854 may be connected to the system bus 828 by a hard disk drive interface 836, a memory card reader interface 838, and an optical drive interface 840, respectively. The drives and their associated computer-readable media may provide nonvolatile storage of computer-readable instructions, data structures, program modules and other data for the computing system 800.

Although the computing system 800 is described herein as having a hard disk, a removable memory card 856 and a removable optical disk 858, it should be appreciated by those skilled in the art that the computing system 800 may also include other types of computer-readable media that may be accessed by a computer. For example, such computer-readable media may include computer storage media and communication media. Computer storage media may include volatile and non-volatile, and removable and nonremovable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 800. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 800 may also include a host adapter 833 that connects to a storage device 835 via a small computer system interface (SCSI) bus, a Fiber Channel bus, an eSATA bus, or using any other applicable computer bus interface. The computing system 800 can also be connected to a router 864 to establish a wide area network (WAN) 866 with one or more remote computers 874. The remote computers 874 can also include hard disks 872 that store application programs 870.

A number of program modules may be stored on the hard disk 850, memory card 856, optical disk 858, ROM 812 or RAM 816, including an operating system 818, one or more application programs 820, and program data 824. In certain implementations, the hard disk 850 may store a database system. The database system could include, for example, recorded points. The application programs 820 may include various mobile applications ("apps") and other applications configured to perform various methods and techniques described herein. The operating system 818 may be any suitable operating system that may control the operation of a networked personal or server computer.

A user may enter commands and information into the computing system 800 through input devices such as buttons 862. Other input devices may include a microphone (not shown). These and other input devices may be connected to the CPU 830 through a serial port interface 842 coupled to system bus 828, but may be connected by other interfaces, such as a parallel port, game port or a universal serial bus (USB).

Certain implementations may be configured to be connected to a radar interface 880, sonar interface 881, and GPS system 885. The radar interface 880, sonar interface 881, and GPS system 885 may be connected via the network interface 844. The computing system 800, the monitor 834, the screen 105, and the buttons 862 may be integrated into a console, forming the display device 100.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable medium having stored thereon computer-executable instructions which, when executed by a computer, cause the computer to:
   display a plurality of first icons, wherein each first icon represents a different marine electronic data type capable of being displayed;
   receive a first selection of a first icon from among the plurality of first icons indicating a desire to display the marine electronic data type represented by the selected first icon;
   based on the first selection, determine a plurality of second icons, wherein each second icon represents a combination that includes the marine electronic data type represented by the selected first icon and at least one different marine electronic data type;
   display the plurality of second icons;
   receive a second selection of a second icon from among the plurality of second icons indicating a desire to display the combination of marine electronic data types represented by the selected second icon; and
   based on the second selection, display the combination of marine electronic data types represented by the selected second icon.

2. The non-transitory computer-readable medium of claim 1, wherein the computer-executable instructions that cause the computer to display the combination of marine electronic data types comprise computer-executable instructions that cause the computer to split an area of a computer screen to display the combination.

3. The non-transitory computer-readable medium of claim 1, wherein the marine electronic data types comprise one or more of a chart data type, a sonar data type, a structure data type, a radar data type, a steering data type, and a dashboard information type.

4. The non-transitory computer-readable medium of claim 1, wherein the computer-executable instructions further causes the computer to receive a third selection after or in conjunction with the first selection indicating a desire to display the marine electronic data type represented by the selected first icon in combination with another different marine electronic data type.

5. The non-transitory computer-readable medium of claim 1, wherein the computer-executable instructions that causes the computer to receive the first selection further comprises computer-executable instructions that cause the computer to sense a touch and hold input on or over the selected first icon for a pre-determined time period to indicate a desire to display the marine electronic data type represented by the selected first icon in combination with another different marine electronic data type.

6. The non-transitory computer-readable medium of claim 1, wherein the computer-executable instructions further causes the computer to:
   based on the second selection, determine a plurality of third icons, wherein each third icon represents a second combination that includes the combination of marine electronic data types represented by the selected second icon and at least one different marine electronic data type;

display the plurality of third icons;

receive a third selection of a third icon from among the plurality of third icons indicating a desire to display the second combination of marine electronic data types represented by the selected third icon; and based on the third selection, display the second combination of marine electronic data types represented by the selected third icon.

7. The non-transitory computer-readable medium of claim 1, wherein each of the first icons and each of the second icons illustrate a representation of the corresponding marine electronic data type and not actual marine electronic data, wherein the computer-executable instructions that causes the computer to display the plurality of first icons comprises computer-executable instructions that cause the computer to display the plurality of first icons without displaying corresponding marine electronic data represented by each of the plurality of first icons, and wherein the computer-executable instructions that causes the computer to display the plurality of second icons comprises computer-executable instructions that cause the computer to display the plurality of second icons without displaying corresponding marine electronic data represented by each of the plurality of second icons.

8. The non-transitory computer-readable medium of claim 1, wherein the computer-executable instructions that causes the computer to display the combination of marine electronic data types represented by the selected second icon comprises computer-executable instructions that further cause the computer to display current data for each marine electronic data type of the combination of marine electronic data types represented by the selected second icon.

9. An apparatus for displaying marine electronic navigation data, said apparatus comprising:
one or more processors;
a screen configured to display at least two panes; and
memory having a plurality of executable instructions which, when executed by the one or more processors, cause the one or more processors to:
display a plurality of first icons, wherein each first icon represents a different marine electronic data type capable of being displayed;
receive a first selection of a first icon from among the plurality of first icons indicating a desire to display the marine electronic data type represented by the selected first icon;
based on the first selection, determine a plurality of second icons, wherein each second icon represents a combination that includes the marine electronic data type represented by the selected first icon and at least one different marine electronic data type;
display the plurality of second icons;
receive a second selection of a second icon from among the plurality of second icons indicating a desire to display the combination of marine electronic data types represented by the selected second icon; and
based on the second selection, display the combination of marine electronic data types represented by the selected second icon.

10. The apparatus of claim 9, wherein the plurality of executable instructions that causes the one or more processors to display the combination of marine electronic data types comprises executable instructions that cause the one or more processors to split an area of the screen to display the combination.

11. The apparatus of claim 9, wherein the marine electronic data types comprise one or more of a chart data type, a sonar data type, a structure data type, a radar data type, a steering data type, and a dashboard information type.

12. The apparatus of claim 9, wherein the plurality of executable instructions further cause the one or more processors to receive a third selection after or in conjunction with the first selection indicating a desire to display the marine electronic data type represented by the selected first icon in combination with another different marine electronic data type.

13. The apparatus of claim 9, wherein the plurality of executable instructions that causes the one or more processors to receive the first selection comprise executable instructions that further cause the one or more processor to sense a touch and hold input on or over the selected first icon for a pre-determined time period to indicate a desire to display the marine electronic data type represented by the selected first icon in combination with another different marine electronic data type.

14. The apparatus of claim 9, wherein the plurality of executable instructions further cause the one or more processors to:
based on the second selection, determine a plurality of third icons, wherein each third icon represents a second combination that includes the combination of marine electronic data types represented by the selected second icon and at least one different marine electronic data type;
display the plurality of third icons;
receive a third selection of a third icon from among the plurality of third icons indicating a desire to display the second combination of marine electronic data types represented by the selected third icon; and
based on the third selection, display the second combination of marine electronic data types represented by the selected third icon.

15. The apparatus of claim 9, wherein each of the first icons and each of the second icons illustrate a representation of the corresponding marine electronic data type and not actual marine electronic data, wherein the plurality of executable instructions that causes the one or more processors to display the plurality of first icons comprise executable instructions that further cause the one or more processor to display the plurality of first icons without displaying corresponding marine electronic data represented by each of the plurality of first icons, and wherein the plurality of executable instructions that causes the one or more processors to display the plurality of second icons comprise executable instructions that further cause the one or more processor to display the plurality of second icons without displaying corresponding marine electronic data represented by each of the plurality of second icons.

16. The apparatus of claim 9, wherein the plurality of executable instructions that causes the one or more processors to display the combination of marine electronic data types represented by the selected second icon comprise executable instructions that further cause the one or more processors to display current data for each marine electronic data type of the combination of marine electronic data types represented by the selected second icon.

17. A method for displaying marine electronic data, comprising:

displaying, on a screen, a plurality of first icons, wherein each first icon represents a different marine electronic data type capable of being displayed;

receiving a first selection of a first icon from among the plurality of first icons indicating a desire to display the marine electronic data type represented by the selected first icon;

based on the first selection, determine, by a computer, a plurality of second icons, wherein each second icon represents a combination that includes the marine electronic data type represented by the selected first icon and at least one different marine electronic data type;

displaying, on the screen, the plurality of second icons;

receiving a second selection of a second icon from among the plurality of second icons indicating a desire to display the combination of marine electronic data types represented by the selected second icon; and based on the second selection, display, on the screen, the combination of marine electronic data types represented by the selected second icon.

18. The method of claim 17, wherein displaying the combination of marine electronic data types comprises splitting an area of the computer screen to display the combination.

19. The method of claim 17, wherein the marine electronic data types comprise one or more of a chart data type, a sonar data type, a structure data type, a radar data type, a steering data type, and a dashboard information type.

20. The method of claim 17 further comprising receiving a third selection after or in conjunction with the first selection indicating a desire to display the marine electronic data type represented by the selected first icon in combination with another different marine electronic data type.

21. The method of claim 17, wherein receiving the first selection further comprises sensing a touch and hold input on or over the selected first icon for a pre-determined time period to indicate a desire to display the marine electronic data type represented by the selected first icon in combination with another different marine electronic data type.

22. The method of claim 17 further comprising:

based on the second selection, determining a plurality of third icons, wherein each third icon represents a second combination that includes the combination of marine electronic data types represented by the selected second icon and at least one different marine electronic data type;

displaying the plurality of third icons;

receiving a third selection of a third icon from among the plurality of third icons indicating a desire to display the second combination of marine electronic data types represented by the selected third icon; and based on the third selection, displaying the second combination of marine electronic data types represented by the selected third icon.

23. The method of claim 17, wherein each of the first icons and each of the second icons illustrate a representation of the corresponding marine electronic data type and not actual marine electronic data, wherein displaying the plurality of first icons further comprises displaying the plurality of first icons without displaying corresponding marine electronic data represented by each of the plurality of first icons, and wherein displaying the plurality of second icons further comprises displaying the plurality of second icons without displaying corresponding marine electronic data represented by each of the plurality of second icons.

* * * * *

UNITED STATES PATENT AND TRADEMARK OFFICE
CERTIFICATE OF CORRECTION

| | |
|---|---|
| PATENT NO. | : 9,442,636 B2 |
| APPLICATION NO. | : 13/791731 |
| DATED | : September 13, 2016 |
| INVENTOR(S) | : Paul Butterworth |

It is certified that error appears in the above-identified patent and that said Letters Patent is hereby corrected as shown below:

In the claims
Claim 17, Column 13, Line 13 "displaying, on the screen, the a plurality of second icons;" should read --displaying, on the screen, the plurality of second icons;--.

Signed and Sealed this
First Day of November, 2016

Michelle K. Lee
*Director of the United States Patent and Trademark Office*